Patented Jan. 24, 1928.

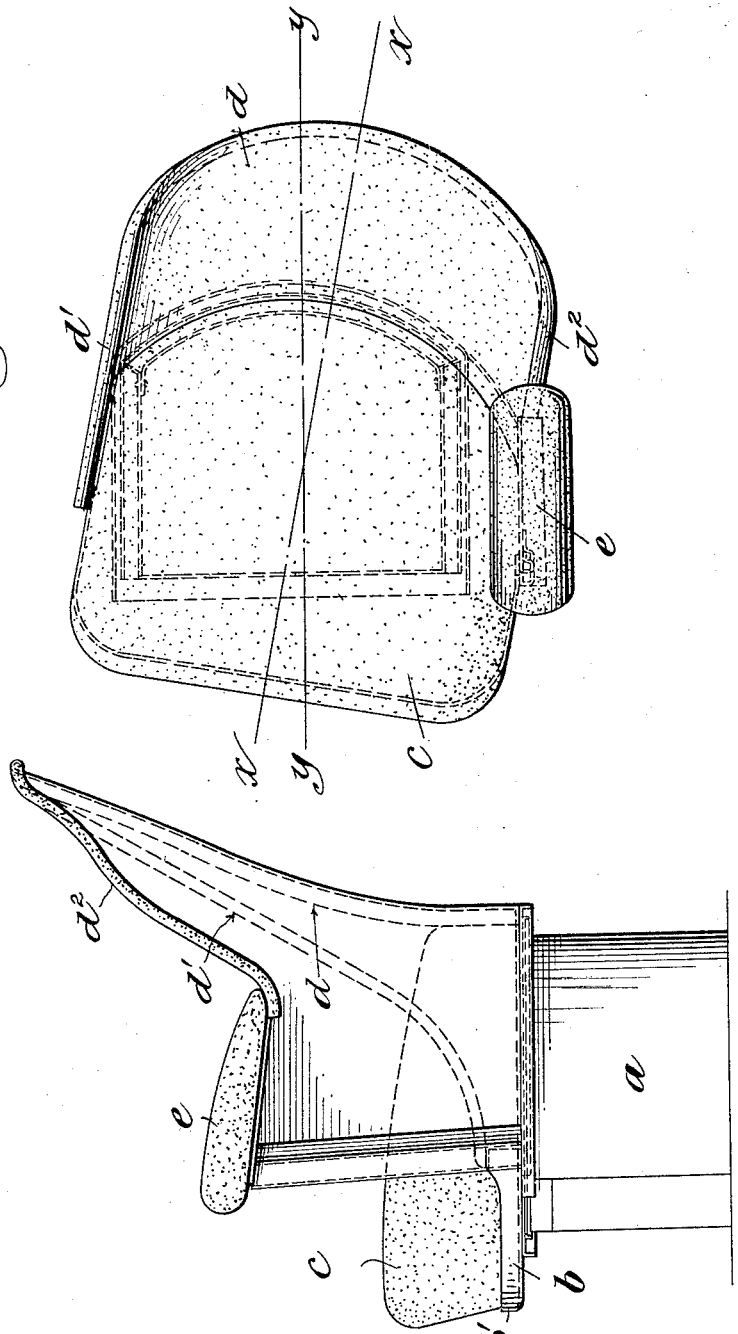

1,656,946

UNITED STATES PATENT OFFICE.

ROY A. HAUER, OF NEW ROCHELLE, NEW YORK, ASSIGNOR TO INTERNATIONAL MOTOR COMPANY, OF NEW YORK, N. Y., A CORPORATION OF DELAWARE.

DRIVING SEAT.

Application filed January 22, 1927. Serial No. 162,776.

The present invention relates, in general, to seats adapted for use upon vehicles and the like, and more particularly, has to do with a special form of seat suitable for the driver of the vehicle. The proposed seat is intended to provide a rest for the driver in a position which he usually assumes while operating the vehicle. Most drivers sit on the left side when driving, and face slightly away from the directly forward position assumed by the occupants of the vehicle. Accordingly, the present seat will be positioned at an angle to the longitudinal plane of the vehicle, and will embody several other features which have been found highly desirable in seats of this type.

Further and other objects will appear in the following specification and reference will now be had to the drawings forming a part hereof wherein:

Figure 1 is a side elevation of the proposed seat showing the configuration of the left-hand side thereof.

Figure 2 is a plan view showing the angular position in which the seat is disposed.

In the drawings $a$ represents a base, or suitable pedestal, upon which the seat is carried, and which is secured to the floor of the vehicle, not shown. $b$ designates the bottom portion of a seat which is adapted, by an upturned flange $b'$, to receive the cushion element $c$ in a well known manner.

The back of the seat is shown at $d$, and in the present instance, comprises a one-piece, pressed metal element which forms both rear and side upright portions of the seat. On the right-hand side of the seat, the rear portion $d$ slopes downwardly as at $d'$ in the manner now most common. On the left-hand side of the back $d$, the side is given an irregular profile such as will form a rest for the left arm and shoulder of the driver as he snuggles into a driving position. This irregularity or extension is indicated at $d^2$ and, in the present instance, is formed as a unitary structure with the upright seat portion $d$.

As a continuation of the left side of the seat, and to carry out the purpose of the present invention to a greater extent, an arm rest $e$ is provided which is formed at a suitable height and is of the desired size and shape.

The entire seat structure is oriented at an angle to the longitudinal axis of the bus indicated by the line $y, y$, the axis of the seat being represented by the line $x, x$, in Figure 2.

From the above description it will be apparent that a seat has been provided which enables the driver to be rested and seated in a position in which the motion of the vehicle forward and backward is not all taken on his abdomen. The structure forms a comfortable support for the driver's left shoulder and arm and enables him to assume his usual driving position without imposing the strains found with old forms of seats during operation.

It is obvious that the specific disposition of the elements, and means of accomplishing the purposes set forth herein may be changed without departing from the scope of the present invention as set forth in the appended claim.

What I claim is:

In a driving seat, a base, a seat portion, means carried by the seat portion for providing a back rest, means for mounting the seat at an angle to the median line of the vehicle, means formed on the side of the back portion away from the median line and integral therewith for providing a rest for the side of the occupant when normally leaning thereagainst, an arm rest formed as a continuation of the side rest, and means for mounting the seat at an angle to the median line of the vehicle with the arm rest disposed forwardly in the direction of travel and parallel to the median line of the vehicle, whereby provision is made for the resting of the driver's body when leaning in a normal driving position.

This specification signed this 10th day of January, A. D. 1927.

ROY A. HAUER.